(12) United States Patent
Yoshida et al.

(10) Patent No.: US 10,762,502 B1
(45) Date of Patent: Sep. 1, 2020

(54) PROVIDING AN ALERT TO A CARDHOLDER

(71) Applicant: Capital One Services, LLC, McLean, VA (US)

(72) Inventors: Shena Yoshida, McLean, VA (US); Christopher Ribetti, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/598,121

(22) Filed: Oct. 10, 2019

(51) Int. Cl.
*G06Q 20/00* (2012.01)
*G06Q 20/38* (2012.01)
*G06Q 20/34* (2012.01)
*G06K 19/07* (2006.01)
*G06K 19/077* (2006.01)

(52) U.S. Cl.
CPC ....... *G06Q 20/389* (2013.01); *G06K 19/0707* (2013.01); *G06K 19/07705* (2013.01); *G06Q 20/00* (2013.01); *G06Q 20/341* (2013.01); *G06Q 20/352* (2013.01)

(58) Field of Classification Search
USPC .......................................................... 705/44
See application file for complete search history.

(56) References Cited

U.S. PATENT DOCUMENTS

| | | | |
|---|---|---|---|
| 5,603,078 A | 2/1997 | Henderson et al. | |
| 6,689,666 B1 * | 2/2004 | Thio | H01L 21/28247 257/E21.626 |
| 7,143,942 B2 | 12/2006 | Yamanaka et al. | |
| 7,150,392 B2 * | 12/2006 | Utz | G07F 19/201 235/379 |
| 8,074,877 B2 | 12/2011 | Mullen et al. | |
| 8,256,667 B2 | 9/2012 | Poznansky et al. | |
| 8,317,094 B2 | 11/2012 | Lehman | |
| 8,485,437 B2 | 7/2013 | Mullen et al. | |
| RE45,615 E * | 7/2015 | Bonalle | G06Q 20/00 |
| 9,092,447 B1 * | 7/2015 | Anderson | G06Q 20/3827 |
| 9,299,020 B2 * | 3/2016 | Zimmerman | G06K 19/042 |
| 9,607,189 B2 * | 3/2017 | Gardiner | G06K 7/10158 |
| 9,892,405 B2 | 2/2018 | Olson et al. | |
| 10,504,096 B1 * | 12/2019 | Hafemann | G06Q 20/20 |
| 2002/0002545 A1 * | 1/2002 | Resneck | G06Q 20/04 705/74 |
| 2012/0153028 A1 * | 6/2012 | Poznansky | G06Q 20/385 235/492 |

(Continued)

OTHER PUBLICATIONS

Innovative LED Lights on ID Cards drive volume, the Asian Banker (Year: 2018).*

(Continued)

*Primary Examiner* — Bruce I Ebersman
(74) *Attorney, Agent, or Firm* — Banner & Witcoff, Ltd.

(57) ABSTRACT

Example methods and systems describe transaction cards with one or more light sources to provide a status of a transaction to a cardholder. For example, a transaction card may determine whether a transaction is a duplicate of a prior transaction, and, if the transaction card determines that the transaction is a duplicate of a prior transaction, the transaction card may provide an alert to the cardholder that indicates that the cardholder has been charged twice for a single transaction.

26 Claims, 5 Drawing Sheets

(56) References Cited

U.S. PATENT DOCUMENTS

| | | | | |
|---|---|---|---|---|
| 2012/0289291 A1* | 11/2012 | Moran | ............... | H04M 1/0256 |
| | | | | 455/566 |
| 2016/0132874 A1* | 5/2016 | Carrott | ............... | G06Q 20/3829 |
| | | | | 705/71 |
| 2017/0099084 A1* | 4/2017 | Endo | ................... | H04B 5/0056 |
| 2019/0286805 A1* | 9/2019 | Law | ....................... | G06F 21/34 |

OTHER PUBLICATIONS

Dec. 4, 2018, Richard Hartung. "Innovative LED Lights on Cards Drive Volume at Taishin." The Asian Banker.

Jan. 9, 2019, "Indusind Bank and Dynamics Launch the Nexxt Credit Card—India's First Battery-Powered Interactive Card." Business Wire.

\* cited by examiner

PROVIDING AN ALERT TO A CARDHOLDER

FIELD OF USE

Aspects of the disclosure relate generally to transaction cards and more specifically to providing alerts, via the transaction card, to a cardholder.

BACKGROUND

When financial institutions wish to convey transaction information to a cardholder, the cardholder, oftentimes, engages with the financial institution through an app on their mobile device, a website, or telephonically. This engagement typically involves login procedures or entering account information. The entire process may be time-consuming.

Aspects of some examples described herein may address one or more of these and other problems.

SUMMARY

The following presents a simplified summary of various aspects described herein.

This summary is not an extensive overview, and is not intended to identify key or critical elements or to delineate the scope of the claims. The following summary merely presents some concepts in a simplified form as an introductory prelude to the more detailed description provided below. Corresponding apparatus, systems, methods, and computer-readable media are also within the scope of the disclosure.

Example methods and systems disclosed herein describe transaction cards with one or more light sources to provide a status of a transaction to a cardholder. For example, a transaction card may provide an indication of a successful transaction, a failed transaction, a duplicate transaction, etc. As a further example, a transaction card may process a transaction and determine whether the transaction is a duplicate of a prior transaction and the transaction card may provide an alert to the cardholder that indicates that the cardholder has been charged twice for a single transaction.

These features, along with many others, are discussed in greater detail below.

BRIEF DESCRIPTION OF THE DRAWINGS

The present disclosure is described by way of example and not limited in the accompanying figures in which.

DETAILED DESCRIPTION

In the following description of the various example embodiments, reference is made to the accompanying drawings, which form a part hereof, and in which is shown by way of illustration various example embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for providing alerts to a cardholder. For example, some embodiments describe techniques for notifying a cardholder of a double-charge. This may provide advantages over other techniques of quickly and efficiently notifying cardholders of duplicate charges.

Example methods and systems may include a transaction card with one or more light sources to provide a status of a transaction to a cardholder. For instance, the transaction card may provide an indication of a successful transaction, a failed transaction, a duplicate transaction, etc. The transaction card may process the transaction and determine whether a transaction is a duplicate of a prior transaction by comparing the transaction to a table of recent transactions. The transaction card may provide an indication that the transaction was completed. Similarly, when the transaction card determines that the transaction is a duplicate of a recent transaction, the transaction card may provide an alert to the cardholder that indicates that the cardholder has been charged twice for a single transaction.

Figure 1:
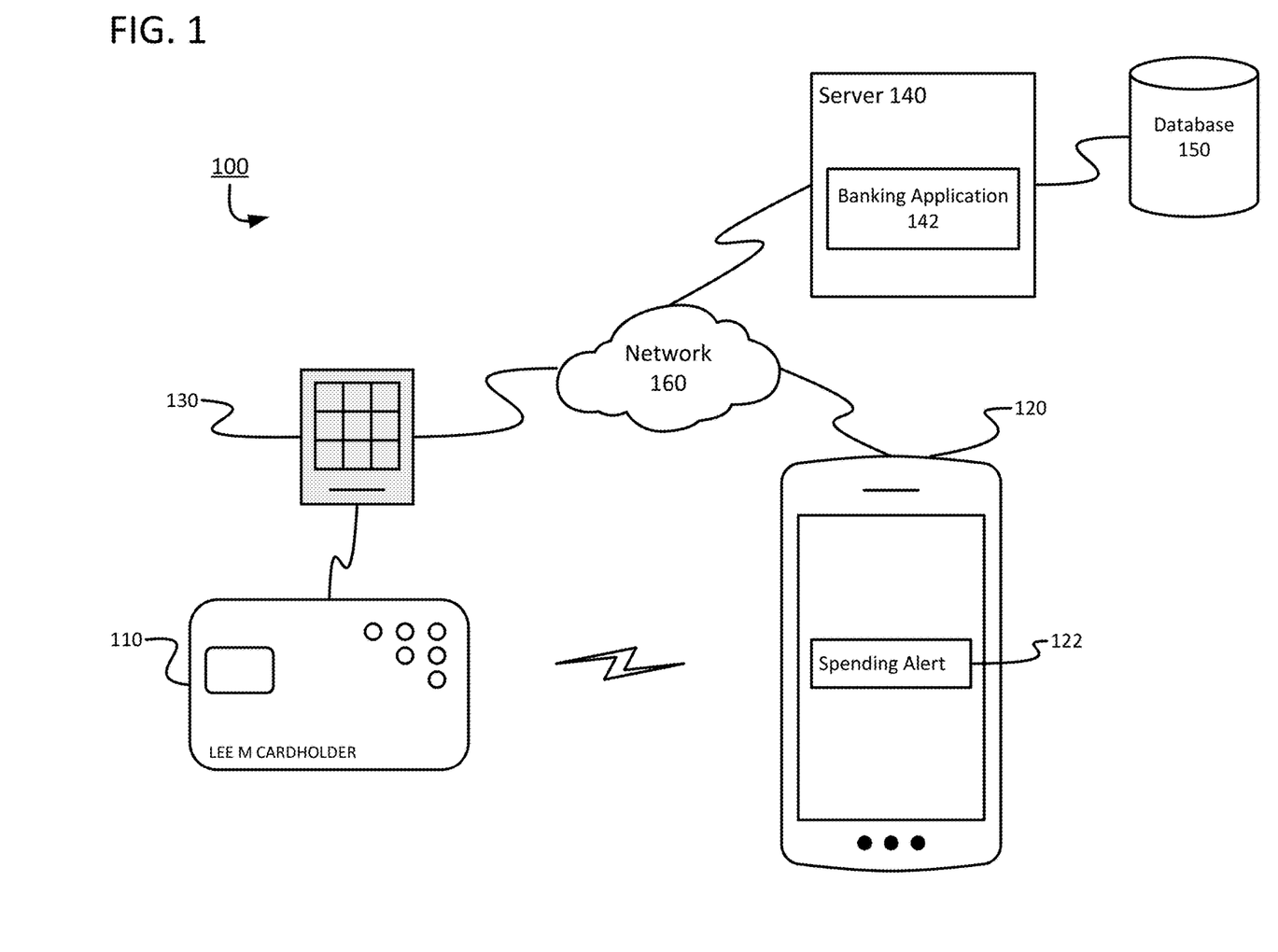
FIG. 1 shows an example of a system in which one or more aspects described herein may be implemented.

Oftentimes, there are several components at work when transacting using a transaction card, such as a debit card or a credit card. FIG. 1 shows a system 100 that illustrates several of the components that may be found when conducting a transaction with a transaction card. For example, system 100 shows transaction card 110 communicatively coupled to mobile device 120 and card reader 130.

Additionally, system 100 shows mobile device 120 and card reader 130 communicatively coupled to server 140, which may include database 150, via network 160.

Transaction card 110 may be any suitable card configured to permit a cardholder to access funds in one or more of a cardholder's account. In this regard, transaction card 110 may be a credit card, a charge card, a debit card, a prepaid card, or the like. In some embodiments, transaction card 110 may provide access to one or more types of accounts. For instance, transaction card 110 may allow a cardholder to select from a credit card option and/or a debit card option. As will be discussed in greater detail with respect to FIG. 2, transaction card 110 may be a chip-enabled card. In some embodiments, transaction card 110 may include a magnetic strip, in addition to the chip. In further embodiments, transaction card 110 may include near field communication (NFC) capabilities, short-range wireless communication capabilities (e.g., Bluetooth®), wireless communication capabilities (e.g., Wi-Fi), or any combination thereof. The NFC capabilities, short-range wireless communication capabilities, wireless communication capabilities may be referred to collectively as communication capabilities. These communication capabilities may permit transaction card to communicate with mobile device 120 and card reader 130. Additionally, transaction card 110 may include one or more light emitting diodes (LEDs) to provide the cardholder with a status of a transaction, which will be discussed in greater detail below.

Mobile device 120 may be a cellular phone, a mobile phone, a smart phone, a tablet, a laptop. Mobile device 120 may be configured to provide a first cardholder with access to various applications and services. For example, mobile device 120 may provide the first cardholder with access to the Internet. Additionally, mobile device 120 may provide the first cardholder with one or more applications located thereon. The one or more applications may provide the first cardholder with a plurality of tools and access to a variety of services. In some embodiments, the one or more applications may include an application, such as a banking application or credit card application, that allows the first cardholder to set up spending alerts and notifications. The alerts and notifications may include push notifications, such as alert 122. In some embodiments, a push notification, such as alert 122, may be provided to the cardholder in addition to the alert and/or notification provided via transaction card 110.

Card reader 130 may be any suitable card reader capable of reading data and/or information from transaction card 110. In this regard, card reader 130 may be a chip-based reader, a magnetic-based reader, an EMV reader, or any combination thereof. Accordingly, card reader 130 may include a display, a keypad, and a network interface. The display may be present information to the cardholder, such as the amount owed, the status of the transaction, and whether the transaction has been approved or denied. Keypad may allow a cardholder to input a PIN code, password, an amount for withdrawal, and the like. Network interface may be a wired connection, wireless connection, a short-range wireless connection, an NFC connection, or any combination thereof. Network interface may permit card reader 130 to communicate with server 140, via network 160, for example, to authorize a transaction. Similarly, network interface may permit card reader 130 to communicate with transaction card 110 and/or mobile device 120. In these instances, card reader 130 may convey information related to the cardholder's account to transaction card 110 and/or mobile device 120.

Server 140 may be any server capable of executing banking application 142. Additionally, server 140 may be communicatively coupled to database 150. In this regard, first server 140 may be a stand-alone server, a corporate server, or a server located in a server farm or cloud-computer environment. According to some examples, first server 140 may be a virtual server hosted on hardware capable of supporting a plurality of virtual servers.

Banking application 142 may be server-based software configured to provide cardholders with access to their account information and perform routing banking functions. In some embodiments, banking application 142 may be the server-based software that corresponds to the client-based software executing on mobile device 120. Additionally, or alternatively, banking application 132 may provide cardholders access to their account information through a website accessed by mobile device 120 via network 160.

Database 150 may be configured to store information on behalf of banking application 142. Banking information may include, but is not limited to, personal information, account information, and cardholder-preferences. Personal information may include a cardholder's name, address, phone number (i.e., mobile number, home number, business number, etc.), social security number, cardholder name, password, employment information, family information, and any other information that may be used to identify the first cardholder. Account information may include account balances, bill pay information, direct deposit information, wire transfer information, statements, and the like. Cardholder-preferences may define one or more spending thresholds, how cardholders receive notifications and alerts, spending notifications, and the like. Database 150 may include, but is not limited to, relational databases, hierarchical databases, distributed databases, in-memory databases, flat file databases, XML databases, NoSQL databases, graph databases, and/or a combination thereof.

Network 160 may include any type of network. In this regard, first network 160 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and cardholders to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
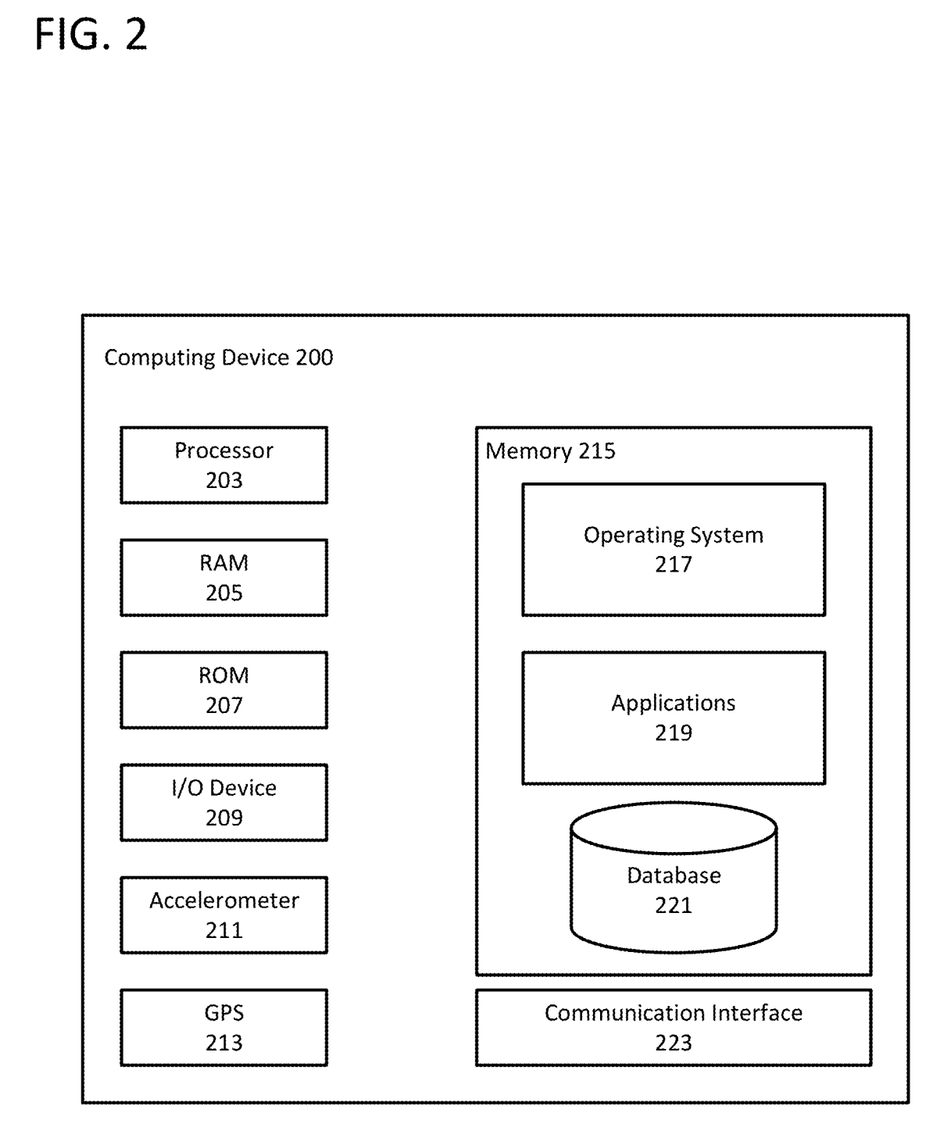
FIG. 2 shows an example of a computing device in accordance with one or more aspects of the disclosure.

Some example embodiments described herein may be implemented, in whole or in part, using one or more computing systems described with respect to FIG. 2. FIG. 2 describes a computing device 200 that may be used with one or more of the computational systems, such as a terminal (e.g., card reader, register, etc.). The computing device 200 may include a processor 203 for controlling overall operation of the computing device 200 and its associated components, including RAM 205, ROM 207, input/output device 209, accelerometer 211, global-position system antenna 213, memory 215, and/or communication interface 223. A data bus may interconnect processor(s) 203, RAM 205, ROM 207, memory 215, I/O device 209, accelerometer 211, global-position system receiver/antenna 213, memory 215, and/or communication interface 223. In some embodiments, computing device 200 may represent, be incorporated in, and/or include various devices such as a desktop computer, a computer server, a mobile device, such as a laptop computer, a tablet computer, a smart phone, any other types of mobile computing devices, electronic terminals, transactional terminals, and the like, and/or any other type of data processing device.

Input/output (I/O) device 209 may include a microphone, keypad, touch screen, and/or stylus through which a cardholder of the computing device 200 may provide input, and may also include one or more of a speaker for providing audio output and a video display device for providing textual, audiovisual, and/or graphical output. In some embodiments, I/O device 209 may include an image capture device.

Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first cardholder. In the context of a banking application, GPS receiver/antenna 213 may be used to locate one or more banking locations.

Communication interface 223 may include one or more transceivers, digital signal processors, and/or additional circuitry and software for communicating via any network, wired or wireless, using any protocol as described herein. Communication interface 223 may also include near field communication (NFC) capabilities, short-range wireless communication capabilities (e.g., Bluetooth®), wireless communication capabilities (e.g., Wi-Fi), or any combination thereof.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication.

An example embodiment of a transaction card may include a one or more light emitting diodes (LEDs) to provide one or more alerts to a cardholder. As discussed above, the alerts may indicate the status of a transaction and whether the cardholder may have been charged twice for a single transaction. The following discussion describes several techniques for notifying a cardholder about the status of a transaction.

Figure 3A:
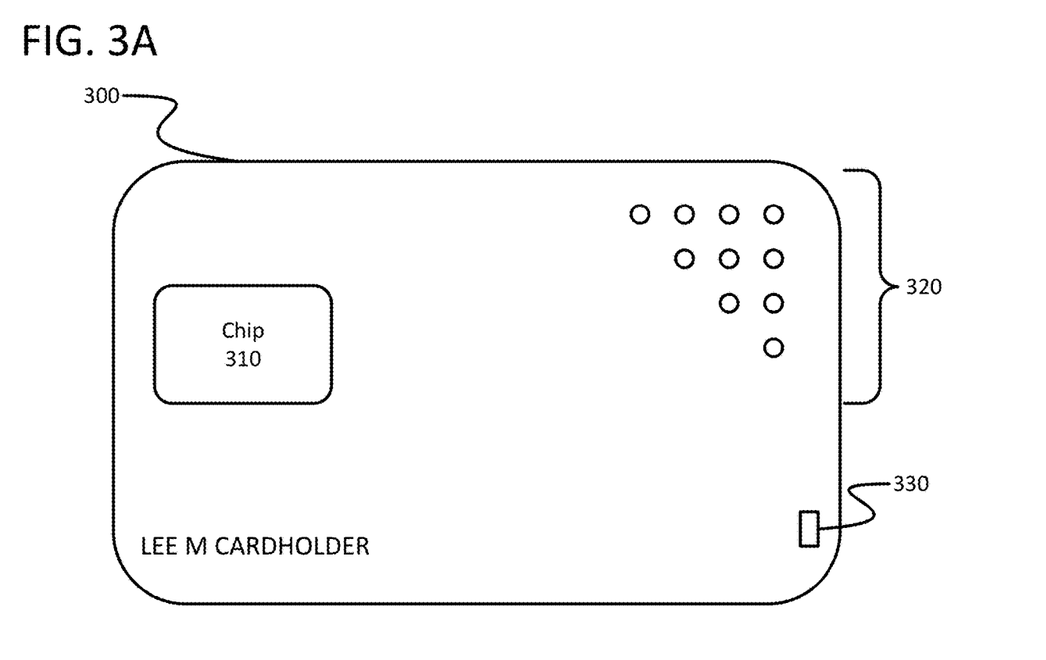
FIGS. 3A and 3B show an example of a transaction card configured to provide one or more alerts to a cardholder in accordance with one or more aspects of the disclosure.
Figure 3B:
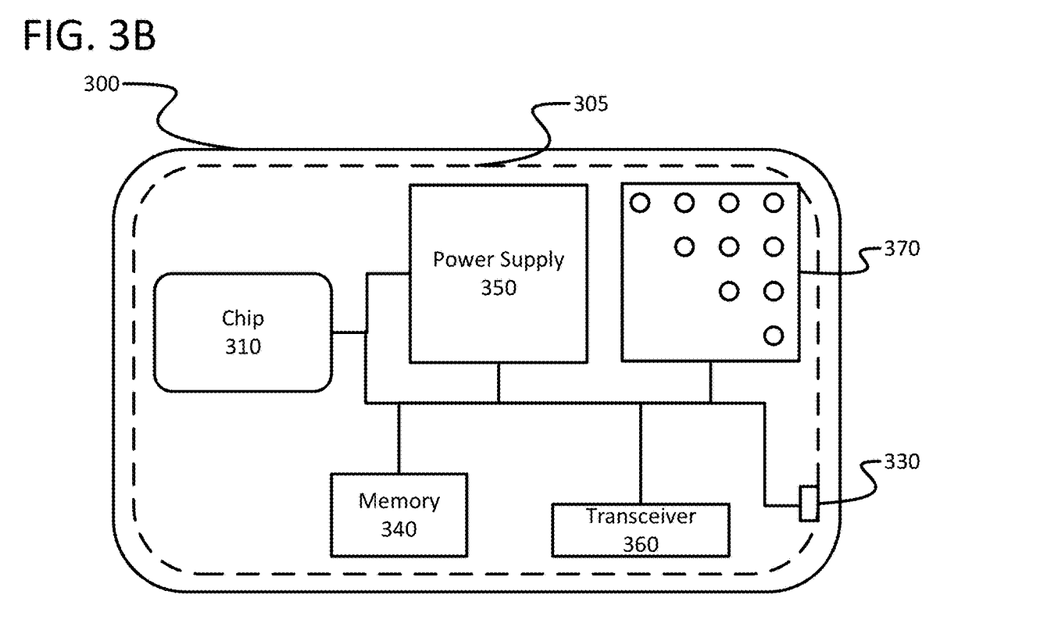

FIGS. 3A and 3B illustrate transaction card 300 according one example embodiment of the disclosure. Transaction card 300 may be of a standard size (or a non-standard size) and made of a substrate, such as plastic, metal, etc. FIG. 3A illustrates a front surface of transaction card 300. As shown, the front surface of transaction card 300 may include chip 310, one or more indicator light emitting diodes (LEDs) 320, and charging port 330.

Chip 310 may be a smart chip or an integrated circuit. In this regard, chip 310 may include a microprocessor and memory, such as read only memory (ROM) and random access memory (RAM). Additionally, chip 310 may include one or more contact pads to receive voltage to power the transaction card and exchange signals with a terminal, such as mobile device 120 and/or card reader 130. In some embodiments, chip 310 may be configured to execute one or more applications. The applications may allow chip 310 to process payments, for example, using a payment application. For example, chip 310 may verify a cardholder via a method supported by the terminal and agreed upon by chip 310. Additionally, chip 310 may confirm the transaction, for example, by verifying the cardholder, determining any processing restrictions, authenticating offline data associated with the cardholder, or any combination thereof. In some instances, the terminal may determine that the transaction is required to be processed online processing. In these instances, chip 310 may generate a request authorization that is transmitted to the issuer, via the terminal. In other examples, one or more applications may allow chip 310 to determine whether a current transaction is a duplicate of an earlier transaction. In further examples, one or more applications may allow chip 310 to perform cryptographic processing, authenticate transaction card 300, define risk management parameters (e.g., when the transaction may be conducted offline), digitally sign payment data, and verify the cardholder. Additionally, or alternatively, chip 310 may be a dual interface chip that provides for contact and contact-less interfaces.

Indicator LEDs 320 may comprise one or more LEDs. In some embodiments, indicator LEDs 320 may be an LED-based screen, such as an OLED- or QLED-display. The one or more LEDs may provide one or more notifications and/or alerts to a cardholder. Preferably, the one or more notifications and/or alerts may be provided at a point of sale, which would convey information to the cardholder without requiring them to engage with their financial institution through an app, a website, and/or a phone call. In operation, the one or more LEDs may be capable of generating a plurality of colors. For example, indicator LEDs 320 may generate a first visual indication upon successful completion of a transaction. In this regard, the first visual indication may illuminate the indicator LEDs 320 a first color, such as green, to indicate that the transaction was completed successfully. Similarly, a second visual indication may be generated by indicator LEDs 320 in response to the transaction being declined. For instance, indicator LEDs 320 may illuminate a second color, such as red, to indicate that the transaction was unsuccessful. In further examples, indicator LEDs 320 may provide a third visual indication to notify the cardholder of a potential issue with the transaction. In this regard, indicator LEDs 320 may illuminate a third color, such as yellow or orange, to notify the cardholder of the potential issue, such as a duplicate charge, insufficient funds, overages, and/or approaching spending limits. While visual indicators have been described in terms of colors, it will be appreciated that other visual indicators may be provided to provide notifications and/or alerts to cardholders at the point of sale. For instance, indicator LEDs 320 may cause one or more LEDs to flash or blink. In some instances, the color generated by indicator LEDs 320 and the number of flashes or blinks may provide an indication of the type of alert and/or notification provided to the cardholder by transaction card 300. In this regard, the number of flashes or blinks may convey different notifications to the cardholder. For instance, one flash may indicate a duplicate charge, two flashes may indicate insufficient funds, three flashes may indicate an overage, and so on. Alternatively, indicator LEDs 320 may generate images and patterns to convey various notifications and/or alerts to the cardholder. For instance, a green circle may indicate successful completion of the transaction, a yellow triangle may indicate a problem with the transaction, and a red octagon may indicate that the transaction is denied.

Charging port 330 may be configured to receive a cable to supply power to recharge power supply 350 (discussed in greater detail below). In this regard, charging port 330 may be mounted to a surface of transaction card 300. In alternative embodiments, charging port 330 may be mounted to an edge of transaction card 300. In some embodiments, charging port 330 may include one or more solar cells configured to provide power to power supply 350. As will be discussed in greater detail below, power supply 350 may include an inductive coil to recharge the power supply via electromagnetic induction, obviating the need for charging port 330.

Turning to FIG. 3B, an example of the hardware of transaction card 300 is shown. In this regard, transaction card 300 may include a flexible circuit board 305 on which chip 310, charging port 330, memory 340, battery 350, transceiver 360, and LED array 370 may be mounted. Flexible circuit board 305 may be sandwiched between two substrate layers that are adjoined along the edges of the substrate layers. As noted above, the substrate layers may be made of plastic, metal, or any equivalent thereof used in the manufacture of transaction cards. Flexible circuit board 305 may be made a flexible plastic substrate, such as polyimide, polyether ether ketone (PEEK), or any transparent conductive polymer. In some instances, flexible circuit board may be screen printed circuits on polyester.

As noted above, several circuits and/or components, including chip 310, charging port 330, memory 340, battery 350, transceiver 360, and LED array 370, may be mounted on flexible circuit board 305. Chip 310, indicator LEDs 320, and charging port 330 may be mounted on flexible circuit board 305 and accessible via one of the substrate layers encasing flexible circuit board 305. Accordingly, chip 310, indicator LEDs 320, and charging port 330 were described in greater detail above with respect to FIG. 3A.

Memory 340 may be any type of media capable of storing data and information accessible by chip 310. Accordingly, memory 340 may include a hard-drive, a solid state drive, memory card, flash drive, ROM, RAM, or other optical disks, as well as other write-capable and read-only memories. Memory 340 may include short term or temporary storage as well as long term or persistent storage. In some embodiments, memory 340 may be integral to chip 310. Alternatively, memory 340 may be a circuit that is separate from chip 310. In some embodiments, memory 340 may store a table that indexes information related to a plurality of recent transactions. The plurality of recent transactions may include a predetermined number (e.g., 10, 50, 100) of transactions. Alternatively, the plurality of recent transactions may be time-based. In this regard, the memory may store recent transactions for a predetermined time period, such as the last day, last week, last month, last six months, etc. The table may index a plurality of information for each transaction. The plurality of information may include a transaction identifier, a merchant name, an amount, an authorization code, a date of the transaction, and/or a time of the transaction. In some instances, the table may also include a hash value for each transaction. The hash value may be generated by hashing one or more of the transaction identifier, the merchant name, the amount, the authorization code, the date of the transaction, and the time of the transaction. The table, and the information stored therein, may allow chip 310 to determine whether a current transaction is a duplicate of an earlier transaction.

Power supply 350 may be any suitable power source capable of providing power to transaction card 300. Power supply 350 may be a battery mounted on, or in, transaction card 300. Accordingly, power supply 350 may be a small, thin battery capable of being mounted on flexible circuit board 305 between two substrate layers. In this regard, power supply 350 may be a rechargeable battery, such as a lithium-ion (Li-ion), lithium-ion polymer (Li-ion polymer), nickel-cadmium (NiCd), nickel-metal hydride (NiMH), or any equivalent thereof. In other instances, power supply 350 may be disposable battery capable of being replaced. In some embodiments, power supply 350 may include an inductive coil that allows power supply 350 to be recharged via electromagnetic induction. In further embodiments, power supply 350 may be one or more solar cells.

Transceiver 360 may be configured to exchange signals with a terminal, such as mobile device 120 and/or card reader 130, on behalf of transaction card 300. Transceiver 360 may include an antenna or other communication capabilities, such as near field communication (NFC), Wi-Fi, Bluetooth®, or any equivalent thereof. Transceiver 360 may be configured to permit transaction card 300 to communicate with card reader 130 and/or mobile device 120. In other embodiments, transceiver 360 may comprise a short-range wireless transceiver configured to exchange signals with card reader 130 and/or mobile device 120.

LED array 370 may be a circuit on which indicator LEDs 320 are mounted. In this regard, LED array 370 may include a driver, or an equivalent circuit, that is capable of illuminating indicator LEDs 320 in the manner described above. Additionally, LED array 370 may include one or more resistors (not shown). Alternatively, or additionally, LED array 370 may include one or more circuits to improve the energy efficiency of LED array 370. In operation, LED array 370 may be communicatively coupled to chip 310. In response to one or more signals received from chip 310, LED array 310 may cause indicator LEDs 320 to display one or more colors to provide an alert and/or notification to the cardholder. As will be discussed in greater detail below, the one or more signals may be transmitted to transaction card 300 from a financial institution or card issuer and routed, via chip 310, to LED array 370 to provide one or more alerts and/or notifications to the cardholder.

Figure 4:
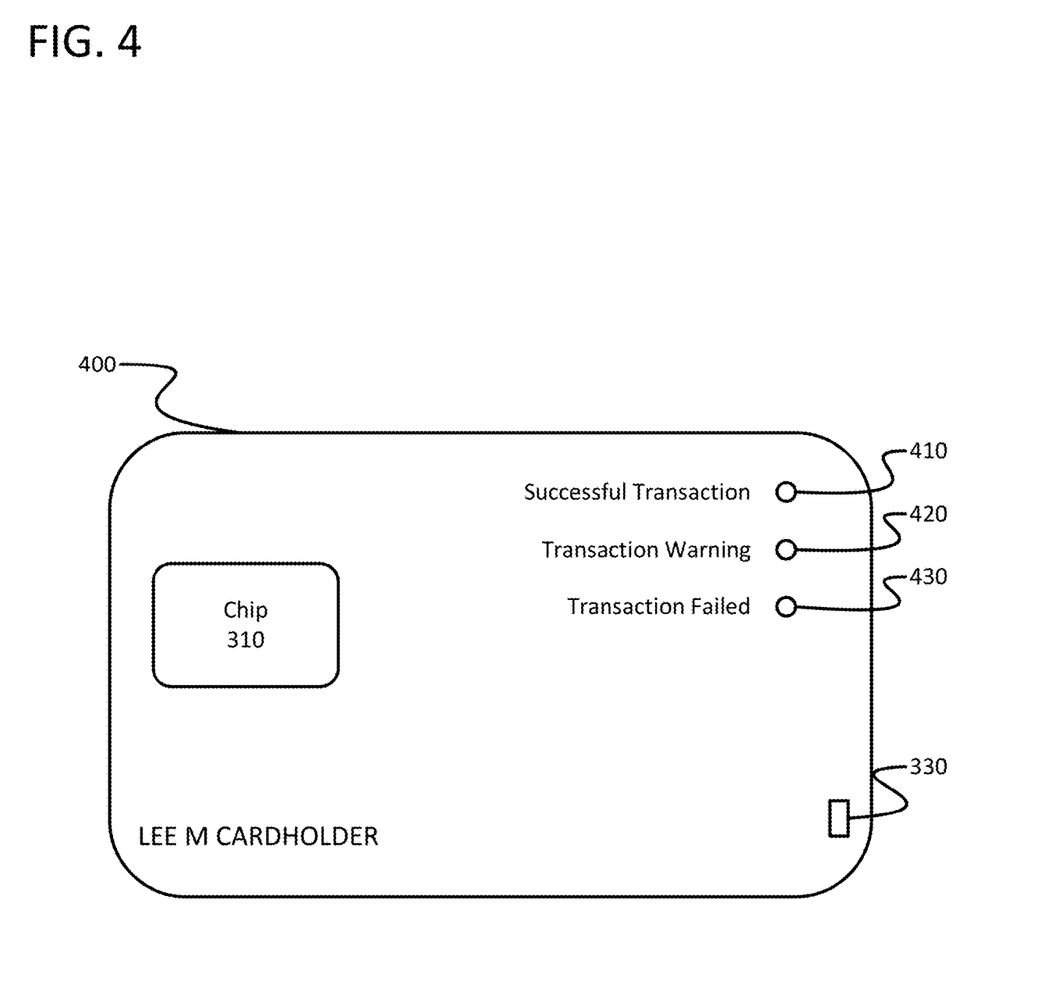
FIG. 4 shows an example of a transaction card configured to provide one or more alerts to a cardholder in accordance with one or more aspects of the disclosure.

In an alternative embodiment, transaction card 300 may provide simpler and more direct alerts simply by illuminating a light source next to text that indicates the status of the transaction. FIG. 4 shows an example of a transaction card configured to provide alerts according to another aspect of the disclosure.

FIG. 4 illustrates an example of transaction card 400. Similar to the transaction card illustrated in FIG. 3A, transaction card 400 may include chip 310 and charging port 330. Transaction card 400 may also include a first light source 410, a second light source 420, and a third light source 430. In some embodiments, first light source 410, a second light source 420, and a third light source 430 may be one or more LEDs. First light source 410, a second light source 420, and a third light source 430 may include text next to the light source. For instance, first light source 410 may be located next to the text "Successful Transaction" to communicate to the cardholder that illumination of first light source 410 indicates a successful transaction; second light source 420 may be located next to the text "Transaction Warning" to communicate to the cardholder that illumination of second light source 420 indicates a problem with the transaction; and third light source 430 may located next to the text "Transaction Failed" to communicate to the cardholder that illumination of third light source 430 indicates a failed transaction. Illumination of the respective light source may indicate the status of the transaction. Additionally, or alternatively, a light source may blink or flash to convey additional information to the cardholder in the manner described above. In some embodiments, first light source 410, a second light source 420, and a third light source 430 may be located on a side of transaction card 400 opposite of chip 310. In this regard, first light source 410, a second light source 420, and a third light source 430 may provide an indication of the status of the transaction while transaction card 400 is inserted in a card reader, such as card reader 130. For example, one or more of the light sources may be illuminated red to indicate that the cardholder should not remove transaction card 400 from card reader 130. The one or more light sources may be illuminated green when the transaction is completed to indicate that the cardholder may remove transaction card 400 from card reader 130.

Figure 5:
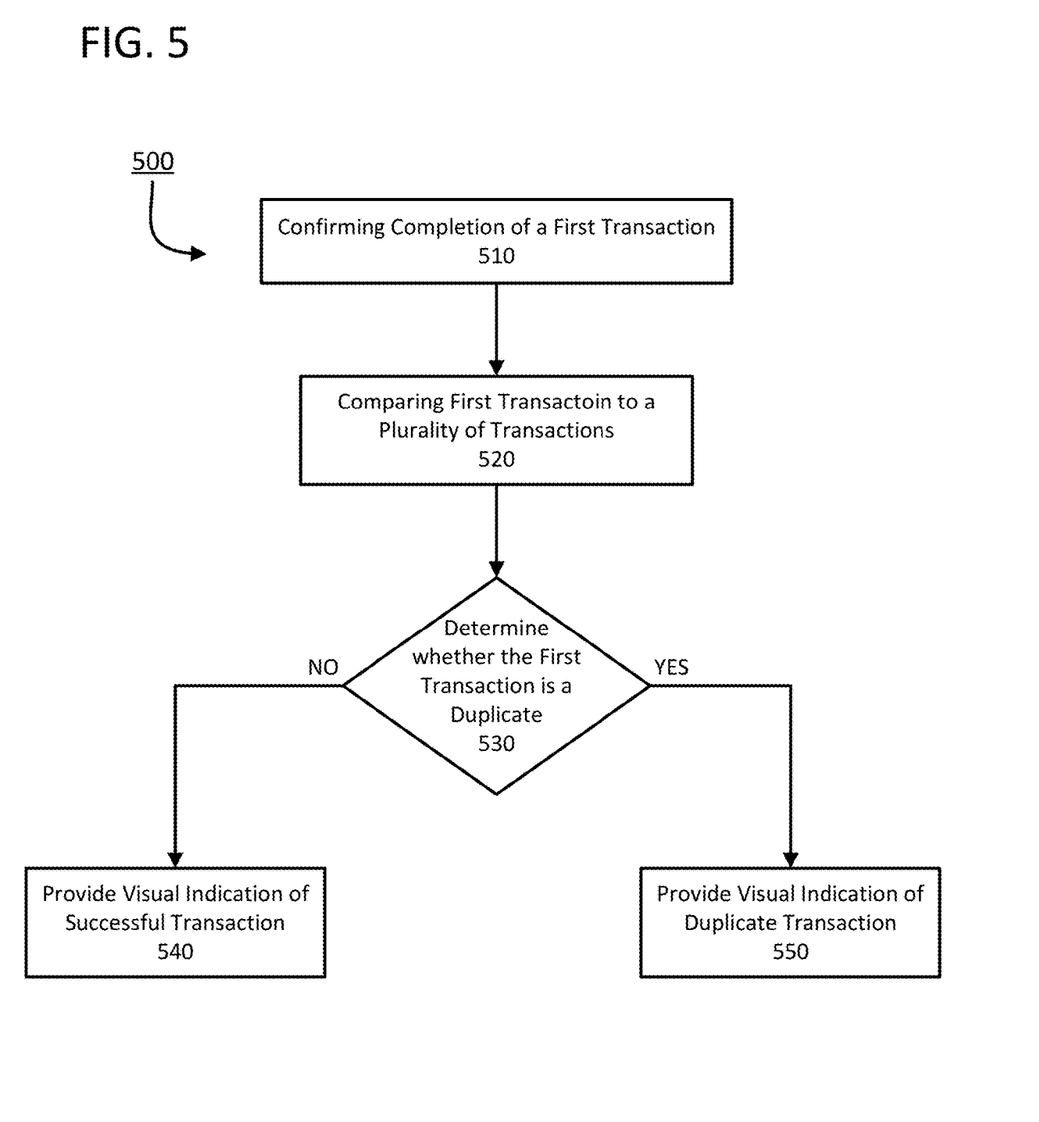
FIG. 5 shows a flow chart of an example process for determining whether a transaction is a duplicate of an earlier transaction according to one or more aspects of the disclosure.

As noted above, transaction card may provide one or more alerts and/or notifications to a cardholder to indicate a status of a transaction. FIG. 5 shows a flow chart of an example process 500 for determining the status of a transaction and whether the transaction is a duplicate of an earlier transaction according to one or more aspects of the disclosure. Some or all of the steps of process 500 may be performed using one or more of the transaction cards described herein. Additionally, some of the steps of process 500 may be performed using one or more of the computing devices described herein in conjunction with one or more of the transaction cards disclosed herein.

In block 510, transaction card 110 may confirm successful completion of a first transaction. As noted above, chip 310 may include one or more applications that enable chip 310 to process the first transaction, determine whether a current transaction is a duplicate of an earlier transaction, perform cryptographic processing, authenticate transaction card 110, define risk management parameters (e.g., when the transaction may be conducted offline), digitally sign payment data, verify the cardholder, or the like. In some embodiments, transaction card 110 may receive a signal from a terminal, such as mobile device 120 and/or card reader 130, that indicates successful completion of the first transaction. In this regard, the signal may be an approval from the card issuer and/or the financial institution. In this regard, chip 310, located on transaction card 110 may process the received signal to complete the transaction. In some examples, chip 310 may illuminate one or more of the indicator LEDs 320 to indicate completion of the transaction using one or more of the techniques described above. Additionally, the transaction card may compare the first transaction to a plurality of prior transactions stored in a memory of the transaction card.

In block 520, transaction card 110 may compare the first transaction to a plurality of transactions. As noted above, transaction card 110 may include a memory that stores a plurality of transactions. As noted above, the memory may include a table that stores a transaction identifier, a merchant name, an amount, an authorization code, a date of the transaction, and/or a time of the transaction for each of the plurality of transactions stored in the table. In this regard, chip 310 may compare the first transaction to the plurality of transactions stored in the table. For example, chip 310 may compare one or more of the transaction identifier, the merchant name, the amount, the authorization code, the date of the transaction, and the time of the transaction of the first transaction to determine whether they match an entry in the table of the plurality of prior transactions. In some embodiments, each entry in the table of prior transactions may include a hash value. The hash value may be generated by hashing one or more of the transaction identifier, the merchant name, the amount, the authorization code, the date of the transaction, and the time of the transaction. Comparing the first transaction to the table of prior transactions may comprise generating a hash value of the first transaction from one or more of the transaction identifier, the merchant name, the amount, the authorization code, the date of the transaction, and the time of the transaction. The hash value of the first transaction may be used to query the table of prior transactions.

In block 530, the transaction card 110 may determine whether the first transaction is a duplicate of at least one prior transaction. In this regard, if one or more of the transaction identifier, the merchant name, the amount, the authorization code, the date of the first transaction, and/or the time of the first transaction match one or more of the entries in the table of prior transactions, transaction card 110 may determine that the first transaction is a duplicate of a prior transaction. For instance, if the first transaction and prior transaction are for the same merchant and the same amount, the transaction card may determine that the first transaction is a duplicate of the prior transaction. Similarly, if the first transaction and prior transaction are both the same amount and occurred within a predetermined time of each other, transaction card 110 may determine that the first transaction is a duplicate of the prior transaction. In yet another example, transaction card 110 may determine that the first transaction is a duplicate of the prior transaction when the first transaction and the prior transaction are both for the same merchant, the same amount, and occurred within a predetermined of each other. In some instances, matching transaction identifiers or authorization codes may suffice to render a determination that the first transaction is a duplicate of a prior transaction. In the example described above related to generating a hash value of the first transaction to query the table of prior transactions, a determination that the first transaction is a duplicate of a prior transaction may be made when the hash value matches a hash value in the table of prior transactions.

If the one or more of the transaction identifier, the merchant name, the amount, the authorization code, the date of the first transaction, and/or the time of the first transaction do not match any of the entries in the table of prior transactions, transaction card 110 may provide a visual indication to the cardholder that the, transaction was completed successfully in block 540. In this regard, transaction card 310 may illuminate one or more LEDs to indicate successful completion of the first transaction. For example, indicator LEDs 320 may be illuminated green to indicate successful completion of the first transaction. Alternatively, a specific LED, such as LED 410, may be illuminated to indicate successful completion of the first transaction. In some examples, block 540 may be skipped if the transaction card 110 has already provided an indication of completion of the transaction. Alternatively, block 540 may be performed to indicate completion of the transaction as described above.

When the first transaction is determined to be a duplicate of a prior transaction, transaction card may provide a first visual indicator to be presented in block 550. Similar to the indication provided to indicate successful completion of the first transaction, transaction card 110 may provide a visual cue to indicate that the first transaction may be a duplicate of a prior transaction. For instance, indicator LEDs 320 may be illuminated yellow or red to indicate that the first transaction is a duplicate of a prior transaction. In some embodiments, indicator LEDs 320 may illuminate a different color than the color used to indicate successful completion of the first transaction, as well as flash to notify the cardholder of the duplicate transaction. In alternative embodiments, a specific LED, such as LED 420, may be illuminated to indicate that the first transaction is a duplicate of a prior transaction. In some example embodiments, the indication of the duplicate transaction may be provided after the transaction card has indicated completion of the transaction. That is, the transaction card may notify the cardholder that the transaction has been completed and, then, subsequently notify the cardholder of a duplicate transaction.

In some embodiments, a signal may be received from the card issuer and/or a financial institution regarding the status of the first transaction. The signal may indicate that the first transaction is a duplicate of an earlier transaction. Accordingly, chip 310 may process the received signal and provide the appropriate visual indicator to the cardholder. For example, if the signal indicates the first transaction was successful, chip 310 may provide a visual indication of such. Similarly, if the first transaction was denied or was a duplicate of an earlier transaction, chip 310 may cause the appropriate visual indication to be provided to the cardholder.

By providing a transaction card that can provide alerts and/or notifications on the card itself, cardholders may be notified at a point of sale without having to wait for a card statement or engage their financial institution (e.g., via an app, through a web interface, via a phone call, etc.). Moreover, being able to convey certain information, such as double charges, allows the cardholder to take corrective action in a timely manner.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although certain specific aspects of various example embodiments have been described, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. Thus, embodiments disclosed should be considered in all respects as examples and not restrictive. Accordingly, the scope of the inventions herein should be determined not by the embodiments illustrated, but by the appended claims and their equivalents.

What is claimed is:

1. A computer-implemented method comprising:
confirming, by a transaction card, completion of a first transaction;
causing, by the transaction card, a first visual indicator to be presented after confirming completion of the first transaction, wherein the first visual indicator comprises illuminating one or more light emitting diodes (LEDs) on the transaction card a first color;
comparing the first transaction to a plurality of transactions stored in a memory of the transaction card;
determining, by the transaction card, that the first transaction is a duplicate of at least one prior transaction based on a determination that the first transaction and at least one of the plurality of transactions stored in the memory of the transaction card were for a same merchant, a same amount, and a same authorization code; and
causing, by the transaction card, a second visual indicator to be presented based on a determination that the first transaction is a duplicate of at least one prior transaction, wherein causing the second visual indicator comprises illuminating the one or more LEDs on the transaction card a second color.

2. The computer-implemented method of claim 1, wherein determining that the first transaction is a duplicate of the at least one prior transaction further comprises:
determining that the first transaction and the at least one prior transaction occurred within a predetermined time of each other.

3. The computer-implemented method of claim 1, wherein causing the second visual indicator to be presented comprises illuminating one or more additional LEDs on the transaction card.

4. The computer-implemented method of claim 1, wherein comparing the first transaction to a plurality of transactions stored in a memory of the transaction card further comprises:
generating a hash value by hashing at least one of a merchant name and an amount of the first transaction; and
query a table of the plurality of transactions using the hash value.

5. The computer-implemented method of claim 1, wherein the first color is different from the second color.

6. The computer-implemented method of claim 1, wherein the second visual indicator comprises flashing the one or more LEDs on the transaction card the second color.

7. The computer-implemented method of claim 1, wherein a chip on the transaction card determines that the first transaction is a duplicate of at least one prior transaction.

8. The computer-implemented method of claim 1, further comprising:
receiving, by the transaction card and from a terminal, a signal indicating completion of the first transaction.

9. The computer-implemented method of claim 1, further comprising:
verifying, by the transaction card, a user prior to confirming completion of the first transaction.

10. A transaction card comprising:
one or more processors;
one or more light emitting diodes (LEDs); and
memory storing instructions that, when executed by the one or more processors, cause the transaction card to:
confirm completion of a first transaction;
cause a first visual indicator to be presented after confirming completion of the first transaction, wherein the first visual indicator comprises illuminating the one or more light emitting diodes (LEDs) on the transaction card a first color;
compare the first transaction to a plurality of transactions;
determine that the first transaction is a duplicate of at least one prior transaction based on a determination that the first transaction and at least one of the plurality of transactions stored in the memory of the transaction card were for a same merchant, a same amount, and a same authorization code; and
cause a second visual indicator to be presented based on a determination that the first transaction is a duplicate of at least one prior transaction, wherein causing the second visual indicator comprises illuminating the one or more LEDs on the transaction card a second color.

11. The transaction card of claim 10, further comprising:
a power supply configured to provide power to the one or more processors and the one or more LEDs.

12. The transaction card of claim 11, further comprising:
a charging port configured to receive a cable to supply power to recharge the power supply.

13. The transaction card of claim 11, wherein the power supply comprises an inductive coil to recharge the power supply via electromagnetic induction.

14. The transaction card of claim 10, further comprising:
one or more solar cells configured to provide power to at least the one or more LEDs.

15. The transaction card of claim 10, further comprising an antenna configured to receive a signal from a computing device associated with a financial institution, wherein the signal indicates to the one or more processors whether the first transaction is a duplicate of the prior transaction; and
the one or more processors are configured to determine whether the first transaction is a duplicate of the prior transaction based on the signal.

16. The transaction card of claim 10, further comprising:
an interface configured to send and receive wireless signals.

17. The transaction card of claim 16, wherein the interface is a near field communication (NFC) interface.

18. The transaction card of claim 16, wherein the interface is a short-range wireless communication interface.

19. One or more non-transitory media storing instructions that, when executed by one or more processors, perform steps comprising:
confirming completion of a first transaction;
causing a first visual indicator to be presented after confirming completion of the first transaction, wherein the first visual indicator comprises illuminating one or more light emitting diodes (LEDs) on a transaction card a first color;
comparing the first transaction to a plurality of transactions stored in a memory;
determining that the first transaction is a duplicate of at least one prior transaction based on a determination that the first transaction and at least one of the plurality of transactions stored in the memory of the transaction card were for a same merchant, a same amount, and a same authorization code; and
causing a second visual indicator to be presented based on a determination that the first transaction is a duplicate of at least one prior transaction, wherein causing the second visual indicator comprises illuminating the one or more LEDs on the transaction card a second color.

20. The one or more non-transitory media of claim 19, wherein the instructions, when executed by the one or more processors, perform steps comprising:
determine that the first transaction and the at least one prior transaction occurred within a predetermined time of each other when determining that the first transaction is a duplicate of the at least one prior transaction.

21. The one or more non-transitory media of claim 19, wherein the instructions, when executed by the one or more processors, perform steps comprising:
generating a hash value by hashing at least one of a merchant name and an amount of the first transaction; and
query a table of the plurality of transactions using the hash value.

22. The one or more non-transitory media of claim 19, wherein the first color is different from the second color.

23. The one or more non-transitory media of claim 19, wherein the second visual indicator comprises flashing the one or more LEDs on the transaction card the second color.

24. The one or more non-transitory media of claim 19, wherein a chip on the transaction card determines that the first transaction is a duplicate of at least one prior transaction.

25. The one or more non-transitory media of claim 19, wherein the instructions, when executed by the one or more processors, perform steps comprising:
receiving, from a terminal, a signal indicating completion of the first transaction.

26. The one or more non-transitory media of claim 19, wherein the instructions, when executed by the one or more processors, perform steps comprising:
verifying a user prior to confirming completion of the first transaction.

* * * * *